United States Patent [19]
Obara

[11] Patent Number: 4,833,289
[45] Date of Patent: May 23, 1989

[54] ELECTRIC DISCHARGE MACHINING CONTROL APPARATUS

[75] Inventor: Haruki Obara, Sagamihara, Japan

[73] Assignee: Fanuc Ltd., Minamitsuru, Japan

[21] Appl. No.: 148,651

[22] PCT Filed: Jun. 17, 1987

[86] PCT No.: PCT/JP87/00394

§ 371 Date: Jan. 15, 1988

§ 102(e) Date: Jan. 15, 1988

[87] PCT Pub. No.: WO87/07860

PCT Pub. Date: Dec. 30, 1987

[30] Foreign Application Priority Data

Jun. 18, 1986 [JP] Japan ............... 61-140339

[51] Int. Cl.$^4$ .................................. B23H 1/02
[52] U.S. Cl. ...................... 219/69.18; 219/69.13
[58] Field of Search .............. 219/69 P, 69 C, 69 G, 219/69 S

[56] References Cited

U.S. PATENT DOCUMENTS

| | | | |
|---|---|---|---|
| 3,755,645 | 8/1973 | Kauffman | 219/69 G |
| 3,883,793 | 5/1975 | Mizuhara et al. | 219/69 C |
| 3,916,138 | 10/1975 | Pfau | 219/69 P |
| 3,973,104 | 8/1976 | Ullmann et al. | 219/69 C |
| 4,387,285 | 6/1983 | Obara | 219/69 C |
| 4,614,854 | 9/1986 | Obara et al. | 219/69 C |
| 4,720,616 | 1/1988 | Inoue | 219/69 P |
| 4,728,764 | 3/1988 | Matsumoto et al. | 219/69 C |
| 4,733,043 | 3/1988 | Bell, Jr. | 219/69 G |

FOREIGN PATENT DOCUMENTS 223523 12/1983 Japan.
85-02800 7/1985 World Int. Prop. O. ........ 219/69 C Primary Examiner—A. D. Pellinen
Assistant Examiner—Geoffrey S. Evans
Attorney, Agent, or Firm—Staas & Halsey

[57] ABSTRACT

An electric discharge machining control apparatus which controls an electric discharge machining power source of a wire electric discharge machine in accordance with a leakage current flowing between a wire electrode (2) and a workpiece (3). This permits stable electric discharge and satisfactory surface roughening. The control apparatus described above, the peak value of a machining voltage applied between the wire electrode (2) and the workpiece (3) is detected by means of a peak voltage detecting circuit (D4, R8, R9, C2). When the leakage current increases so that a detection value is reduced, the on and off times of switching elements (Tr1, Tr2), interposed between a DC power source (1) and the wire electrode and between the DC power source and the workpiece, are changed from a value smaller than the time constant (R1.C1) of a charge and discharge circuit to a value larger than the time constant. Thus, the machining voltage increases. When the leakage current is reduced again the on and off times are changed to the value smaller than the time constant. Thus, the effective machining voltage is kept at a proper value.

10 Claims, 2 Drawing Sheets

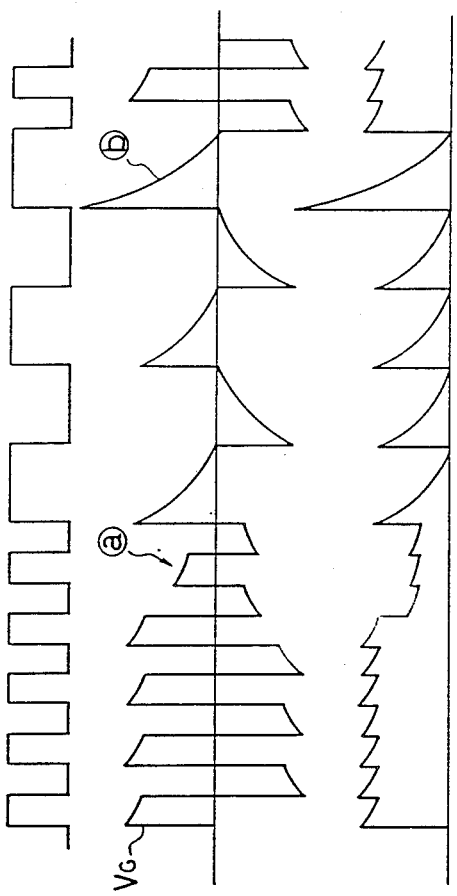
FIG. 2
FIG. 3
FIG. 4
FIG. 5

ELECTRIC DISCHARGE MACHINING CONTROL APPARATUS

TECHNICAL FIELD

The present invention relates to an electric discharge machining control apparatus for controlling an electric discharge machining power source of a wire electric discharge machine, and more particularly, to an electric discharge machining control apparatus adapted for finish machining after rough machining.

BACKGROUND ART

Presently, many of wire electric discharge machines use water as a machining fluid. In this case, a leakage current flows between a wire electrode and a workpiece, whereby electrolysis is effected. In rough machining, the leakage current does not raise any special question. In finish machining which requires control of discharge energy over a necessary range for a desired machining accuracy, however, the magnitude of the leakage current, which influences the discharge energy, arouses a question. Thus, if the energy for each cycle of electric discharge during the finish machining is large, the roughness of the machined surface of the workpiece worsens. In order to improve the surface roughness, therefore, the discharge energy must be reduced, and the peak current must be minimized. On the other hand, a predetermined amount of discharge energy must be produced to maintain stable electric discharge. Since the leakage current, however, changes as the machining conditions, including the wall thickness of the workpiece, the type of machining work, etc., vary, so it is hard to obtain a suitable amount of discharge energy under various machining conditions. If the peak current is adjusted to straight machining, for example, the leakage current increases during a corner machining process, so that a sufficient voltage for stable electric discharge cannot be obtained between the workpiece and the wire electrode.

SUMMARY OF THE INVENTION

Accordingly, the object of the present invention is to provide an electric discharge machining control apparatus designed so that stable electric energy can be produced despite a change of leakage current, thus ensuring stable electric discharge and satisfactory surface roughness.

In order to achieve the above object, an electric discharge machining control apparatus according to the present invention comprises a peak voltage detecting circuit for detecting the peak value of a machining voltage applied between a wire electrode and a workpiece; and control means for controlling the machining voltage applied between the wire electrode and the workpiece in accordance with the peak voltage value detected by means of the peak voltage detecting circuit.

According to the present invention, as described above, if the value of a leakage current produced between the wire electrode and the workpiece changes, the machining voltage applied between the wire electrode and the workpiece is controlled so as to compensate the change of the leakage current. Even though the leakage current increases when the mod of finish machining is changed from straight machining over to corner machining, therefore, the machining voltage applied between the wire electrode and the workpiece can be increased to a required value for stable electric discharge. Thus, the effective machining voltage can be kept at a proper value. As a result, although the voltage or electric energy applied between the wire electrode and the workpiece, in the finish machining, is set to a small value for stable straight machining, the electric energy can be increased when the straight machining, which entails a less leakage current, is switched over to the corner machining in which the leakage current increases. Accordingly, stable electric discharge machining can be performed even during the corner machining process, so that the roughness of the machined surface can be improved.

BRIEF DESCRIPTION OF THE DRAWINGS

FIG. 2 shows waveform indicative of an output from one-shot multivibrators of FIG. 1;

FIG. 3 shows a waveform indicative of a machining gap voltage;

FIG. 4 shows a waveform indicative of an output from a differential amplifier of FIG. 1; and FIG. 5 shows a waveform indicative of a charging voltage of a capacitor of a peak voltage detecting circuit of FIG. 1.

BEST MODE OF CARRYING OUT THE INVENTION

Figure 1:
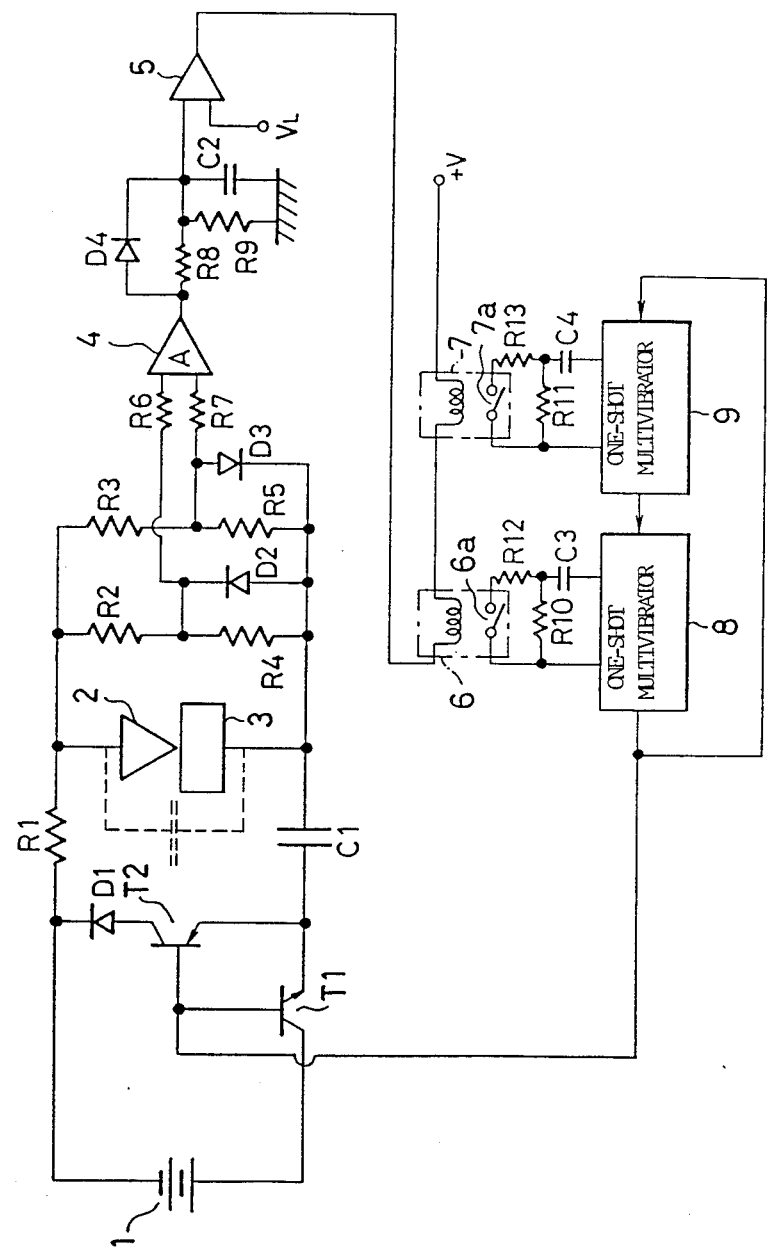
FIG. 1 is a circuit diagram of an electric discharge machining control apparatus according to an embodiment of the present invention.

FIG. 1 shows an electric discharge machining control apparatus according to an embodiment of the present invention. In FIG. 1, numerals 1, 2 and 3 denote a DC power source, a wire electrode, and a workpiece, respectively. Symbol C1 designates a charge and discharge capacitor; R1, a current limiting resistor; T1 and T2, transistors for use as switching elements; and D1, a diode for transistor protection. In the present embodiment, electrolytic corrosion of the workpiece 3 is prevented by the use of a bipolar electric discharge machining power source, which applies a positive or negative machining voltage between the wire electrode 2 and the workpiece 3 by charging or discharging the charge and discharge capacitor C1 with a short period by means of the transistors, as mentioned later. The first and second transistors T1 and T2 are formed of a pnp transistor and an npn transistor, respectively. Such a pulse train as is shown in FIG. 2 is applied to the respective bases of the transistors T1 and T2, as mentioned later. Thus, when one of the transistors is on, the other is off.

Symbols R2 to R5 designate resistors, among which resistors R2 and R4 constitute a voltage divider circuit which serves to divide a gap voltage between the wire electrode 2 and the workpiece 3, and resistors R3 and R5 constitute a similar voltage divider circuit. Diodes D2 and D3 are connected in parallel with resistors R4 and R5, respectively, maintaining their polarity as illustrated. A differential amplifier 4 has two input terminals to which the divided voltages are applied individually through the resistors R6 and R7. The amplifier 4, in conjunction with the resistor R2 to R7 and the diodes D2 and D3, constitutes an absolute value detecting circuit.

In the stage next to the differential amplifier 4 of the absolute value detecting circuit, a capacitor C2 is disposed adjacent to a diode D4 and a resistor R8 which are connected in parallel with each other. The capacitor C2 is adapted to be charged with electricity by the output of the amplifier. A high-resistance resistor R9 for electric discharge is connected in parallel with the capacitor C2. The diode 4, the resistors R8 and R9, and the capacitor C2 constitute a peak voltage detecting circuit for detecting the peak value of the gap voltage between the wire electrode 2 and the workpiece 3.

Numeral 5 denotes a comparator, which compares the charging voltage of the capacitor C2 with a reference voltage VL. When the charging voltage or peak voltage of the capacitor C2 is lower than the reference voltage VL, the comparator 5 delivers an H-level output to deenergize exciting coils of relays 6 and 7, thereby turning off their contacts 6a and 7a.

Numerals 8 and 9 denote one-shot multivibrators. The input terminal of one of the multivibrators is connected to the output terminal of the other multivibrator. The output terminal of the multivibrator 8 is connected to the respective bases of transistors Tr1 and Tr2. The one-shot multivibrators 8 and 9 are constructed so as to be triggered in response to the fall of pulse outputs from multivibrators 9 and 8, respectively. The multivibrators 8 and 9 constitute an oscillator for turning on and off the transistors T1 and T2. CR circuits are externally attached to the multivibrators 8 and 9 in order to variably adjust the widths of the output pulses of the multivibrators 8 and 9 to proper values in accordance with the magnitude of a leakage current flowing between the wire electrode 2 and the workpiece 3. The time constants of the CR circuits are changeable. The CR circuit corresponding to the multivibrator 8 is composed of a capacitor C3, a resistor R10, and a resistor R12 which is connected in parallel with the resistor R10 so that these resistors can be disconnected by means of the relay contact 6a. Likewise, the CR circuit corresponding to the multivibrator 9 is composed of a capacitor C4, a resistor R11, and a resistor R12 which is connected in parallel with the resistor R11 so that these resistors can be disconnected by means of the relay contact 7a. When the relays 6 and 7 are unexcited so that their contacts 6a and 7a are off, therefore, the parallel resistors R12 and R13 are cut off. Thereupon, the respective resistance values of the two CR circuits for the one-shot multivibrators 8 and 9 are larger than when the relays 6 and 7 are excited. Thus, the widths of the output pulses of the one-shot multivibrators 8 and 9 are greater than when the relays 6 and 7 are excited. In other words, the time constant of the CR circuit for the multivibrator 8 takes a value $R10 \cdot R12 \cdot C3/(R10+R12)$, which depends on the respective resistance values of the resistors R10 and R12 and the capacity of the capacitor C3, when the relay 6 is excited so that the relay contact 6a is on. When the relay 6 is unexcited so that the relay contact 6a is off, on the other hand, the time constant takes a value $R10 \cdot C3$ which depends on the resistance value R10 and the capacity C3. Likewise, the time constant of the CR circuit for the multivibrator 9 takes values $R11 \cdot R13 \cdot C4/(R11+R13)$ and $R11 \cdot C4$ when the relay 6 is excited and unexcited, respectively. These circuit constants R10 to R13, C3, and C4 are set so that the widths of the output pulses from the multivibrators 8 and 9 take values smaller enough than a value corresponding to the charge-discharge time constant $R1 \cdot C1$ of an electric discharge machining power circuit when the relays 6 and 7 are excited, and that the pulse widths take values larger enough than the value corresponding to $R1 \cdot C1$ when the relays 6 and 7 are unexcited. In the present embodiment, the widths of the pulses outputted from the one-shot multivibrators 8 and 9 are equal, so that the resistors R10 and R11 have the same resistance value, and the resistors R12 and R13 have the same resistance value. Also, the capacitors C3 and C4 have the same capacity.

The operation of the electric discharge machining control apparatus according to the present embodiment will now be described.

Let it be supposed first that straight machining is being performed by means of a wire electric discharge machine furnished with the control apparatus. In this case, the capacitor C2 of the peak voltage detecting circuit is charged to a voltage value higher than the reference voltage VL of the comparator 5, as described in detail later. As a result, an L-level output is delivered from the comparator 5, so that the relays 6 and 7 are excited. Thus, positive pulses are outputted intermittently from the one-shot multivibrator 8, as shown in FIG. 2, so that the transistors T1 and T2 are alternately turned on and off. When the pulses are applied to the bases of the transistors T1 and T2, the first transistor T1 is turned on, while the second transistor T2 are turned off. Thus, the capacitor C1 is charged with a current flowing through a closed loop, which starts and terminates at the DC power source 1, extending through the transistor T1, workpiece 3, wire electrode 2, capacitor C1, and resistor R1. Subsequently, when the pulses applied to the bases of both transistors are extinguished, the first transistor T1 is turned off, while the second transistor T2 is turned on. Thus, the a closed loop is formed which starts and terminates at the capacitor C1, extending through the transistor Tr2, diode D1, resistor R1, wire electrode 2, and workpiece 3. The charging voltage of the capacitor C1 is applied to the gap between the wire electrode 2 and the workpiece 3. The width of the applied pulses is set to a value smaller enough than the time constant R1,C1 of the electric discharge machining power circuit. While electric charging and discharging of the capacitor C1 are being repeated, therefore, positive and negative voltages are applied alternately to a series circuit of the current limiting resistor R1, the wire electrode 2, and the workpiece 3, as described in detail later. If the voltage of the DC power source 1 and the gap resistance between the wire electrode 2 and the workpiece 3 are E and RG, respectively, the gap voltage VG alternately takes peak values of approximately $\pm(E/2) \times RG/(R1+RG)$, as shown in FIG. 3.

More specifically, when the first transistor T1 is turned on, all the voltage E of the DC power source is first applied to the series circuit of the resistor R1, the wire electrode 2, and the workpiece 3. Thereafter, as the capacitor C1 is charged gradually by means of the time constant $R1 \cdot C1$ of a charging circuit, which is composed of the resistor R1 and the capacitor C1, the voltage across the series circuit of the resistor 1, the wire electrode 2, and the workpiece 3 is lowered gradually. However, the first and second transistors T1 and T2 are turned off and on, respectively, before the capacitor C1 is charged fully. Immediately after switching the on-off state, therefore, the voltage E is applied across the series circuit of the resistor R1, the wire electrode 2, an the workpiece 3, in the direction opposite to that of the applied voltage before the switching. The same phenomenon occurs when the capacitor C1 undergoes electric discharge. More specifically, the voltage, applied across the series circuit of the resistor R1, the wire electrode 2, and the workpiece 3 by the on-off control of the transistors T1 and T2, jumps for the voltage E of the DC power source 1 when the applied voltage rises and falls as the on-off state of the two transistors is switched. As a result, positive and negative voltages are applied to the series circuit. Positive energy (voltage×time) and negative energy applied across the series circuit are equal, and, in this embodiment, the respective widths of the pulses outputted from the one-shot multivibrators 8 and 9 are equal. Accordingly, the on and off times of the output of the multivibrator 8 are equal. Naturally, therefore, positive and negative voltages of the same magnitude are applied across the aforesaid series circuit. After all, positive and negative voltages who's peak values are about ±E/2 are applied when the pulse widths are smaller enough than the time constant R1·C1 of the resistor R1 and the capacitor C1. Thus, the positive and negative voltages VG, whose peak values are ±(E/2)×RG/(R1+RG), are applied alternately to the gap between the wire electrode 2 and the workpiece 3, as described above where RG is the resistance of the gap.

The gap voltages VG are applied to the absolute value circuit which is composed of the resistors R2 to R7, the diodes D2 and D3, and the differential amplifier 4. If the gap voltage VG of a polarity is applied such that the side of the workpiece 3 is positive, then the gap voltage VG is supplied to one input terminal of the differential amplifier 4 through the diode D2 and the resistor R6. A voltage VG·R3/(R3+R5), divided by the resistors R3 and R5, is supplied to the other input terminal of the amplifier 4 through the resistor R7. Consequently, the differential amplifier 4 delivers an output of the value given by the following equation (1):

$$A\{VG - VG \cdot R3/(R3+R5)\} = A \cdot \{VG \cdot 55/(R3+R5)\}, \quad (1)$$

where A is the amplification factor.

If the gap voltage VG of a polarity is applied such that the side of the workpiece 3 is negative, a voltage VG·R4/(R2+R4), divided by the resistors R2 and R4, is applied to the one input terminal of the differential amplifier 4, while a zero voltage is applied to the other input terminal. Thus, the output of the differential amplifier 4 is given by $$A \cdot VG \cdot R4/(R2+R4).$$

Since the resistance values of the absolute value circuit are set so that R4=R5 and R2=R3, we have $$A \cdot VG \cdot R4/(R2+R4) = A \cdot VG \cdot R5/(R3+R5),$$

and the output of the amplifier 4 does not depend on the polarity of the gap voltage VG. Thus, the differential amplifier 4 delivers an output of a value proportional to the absolute value of the gap voltages ±VG, as shown in FIG. 4.

The capacitor C2 of the peak voltage detecting circuit is charged by the output from the differential amplifier 4. The charging voltage of the capacitor C2 is applied to one input terminal of the comparator 5, whereupon it is compared with the reference voltage VL, as shown in FIG. 5. While the charging voltage of the capacitor C2 is higher than the reference voltage VL, the comparator 5 delivers an L-level output, thereby exciting the relays 6 and 7 to turn on the contacts thereof. As a result, the pulses wit the smaller widths are delivered from the one-shot multivibrators 8 and 9 in the aforesaid manner, and the voltage applied to the machining gap is kept at a level adapted for straight machining.

In the case of corner machining by means of the electric discharge machine, however, the leakage current between the wire electrode 2 and the workpiece 3 is so large that the gap voltage VG drops, as indicated by symbol a in FIG. 3. Thus, the charging voltage of the capacitor C2 also drops and becomes lower than the reference voltage VL of the comparator 5. In this case, the comparator 5 delivers an H-level output, thereby de-energizing the relays 6 and 7. Thus, the time constants of the CR circuits, externally attached to the one-shot multivibrators 8 and 9, are increased, so that the widths of the pulses outputted from the one-shot multivibrators 8 and 9 are increased. Since these pulse widths are set so as to be greater than the time constant R1·C1, which depends on the capacitor C1 and the resistor C, the capacitor C1 is charged fully. Thus, the gap voltages VG of ±E·RG/(R1+RG), whose peak value is twice as large as the peak value for straight machining, are applied to the gap between the wire electrode 2 and the workpiece 3, so that the electric discharge energy increases. While the leakage current is thus large, the charging voltage of the capacitor C2 is lower than the reference voltage VL, as shown in FIG. 5. Accordingly, the pulses with the larger widths are delivered from the one-shot multivibrators 8 and 9, so that the electric discharge energy increases, thus maintaining a stable state of electric discharge.

When the leakage current is reduced again after the end of the corner machining, on the other hand, the gap voltage increases, as indicated by symbol b in FIG. 3, so that the peak value of the charging voltage of tee capacitor C2, i.e., the machining voltage, increases to a value higher than the reference voltage VL. At this time, the widths of the output pulses of the one-shot multivibrators 8 and 9 are reduced, thus permitting machining with small discharge energy. In this manner, the discharge energy can be adjusted in accordance with the magnitude of the leakage current, which varies with change of the machining mode, for example.

In the embodiment described above, the bipolar electric discharge machining power source, for use as an electric discharge machining power source, serves to turn on and off the transistors T1 and T2, thereby supplying charge pulses to the charge and discharge capacitor C1 with a period shorter than the charge-discharge time constant R1·C1, so that positive and negative voltages are applied between the wire electrode 2 and the workpiece 2. Alternatively, however, an electric discharge power source may be used which does not apply the positive and negative voltages. In this case, the absolute voltage detecting circuit need not be used, and it is necessary only that the voltage between the wire electrode 2 and the workpiece 3 be divided so that the divided voltages are simply applied to the peak voltage defecting circuit.

The present invention may be applied to a transistor electric discharge circuit, in which a DC power source, current limiting resistor, transistors as switching elements, workpiece, and wire electrode are connected in series, or a capacitor electric discharge circuit, in which a parallel circuit, including a capacitor connected in parallel between a workpiece and a wire electrode, is connected to a DC power source through a current limiting resistor. In this case, it is necessary only that the voltage applied between the workpiece and the wire electrode be controlled by changing the current limiting resistance value in accordance with the magnitude of the leakage current or the output of the comparator, without controlling the on-off time intervals of the transistors. More specifically, a series circuit of a resistor and a switch, which is adapted to be turned on and off in accordance with the output of the comparator, is connected in parallel with the current limiting resistor. The switch is turned on in response to the output of the comparator which is produced when the leakage current increases so that the peak voltage applied to the comparator is lower than the reference voltage. By doing this, the current limiting resistance value is reduced to raise the voltage applied between the workpiece and the wire electrode, thereby increasing the discharge energy. Thus, the discharge is stabilized.

In the above described embodiment, moreover, the pulse widths are changed by turning on and off the transistors T1 and T2 in accordance with the output of the comparator circuit 5, which compares the peak voltage detected by means of the peak voltage detecting circuit with the reference voltage VL. Instead of using the comparator, however, a differential amplifier may be used, whereby the on-off period of the transistors T1 and T2 is changed in accordance with the output of the differential amplifier so that the effective peak voltage is fixed. In this case, the one-shot multivibrators 8 and 9 are replaced with a V-f converter which serves to convert voltage into frequency. By using the V-f converter, the output voltage of the differential amplifier is converted into a frequency corresponding thereto. Thus, the transistors T1 and T2 are turned on and off at this frequency so that the effective voltage is fixed.

I claim:

1. An electric discharge machining control apparatus for intermittently applying a machining voltage between a wire electrode and a workpiece, said machining control apparatus being used with a capacitor electric discharge power source with switching element control for electrically charging and discharging a capacitor by means of a switching element which is turned on and off by an oscillator, said machining control apparatus comprising:
   a peak voltage detecting circuit for detecting a peak value of said machining voltage which changes with a change in a leakage current flowing between said wire electrode and said workpiece; and
   control means having a comparator for comparing the peak voltage value detected by said peak voltage detecting circuit with a reference voltage value, said control means being operable to change, in accordance with an output of said comparator, an oscillation frequency of said oscillator so as to change a ratio of an on time period of said switching element to an off time period thereof, whereby a fluctuation in said leakage current is compensated so that said machining voltage is controlled in a manner stabilizing electric discharge machining.

2. An electric discharge machining control apparatus according to claim 1, wherein said machining control apparatus is used with an electric discharge machine which performs rough machining and finish machining each including straight machining and corner machining, said control means being operable to maintain said machining voltage at a small value enough to prevent deteriorated surface roughness of a machined surface of said workpiece when the straight machining of the finish machining is performed, said control means being operable to increase the machining voltage up to a value at which electric discharge machining is performed in a stabilized manner when the corner machining of the finish machining, where said leakage current increases, is performed.

3. An electric discharge machining control apparatus according to claim 4, wherein said capacitor electric discharge power source with switching element control includes a bipolar electric discharge power source for applying positive and negative voltages between the wire electrode and the workpiece, said electric discharge machining control apparatus comprises an absolute value detecting circuit for detecting the absolute value of the voltage between said wire electrode and said workpiece, and said peak voltage detecting circuit receives the output of said absolute value detecting circuit.

4. An electric discharge machining control apparatus for intermittently applying a machining voltage between a wire electrode and a workpiece, said machining control apparatus being used with a capacitor electric discharge power source with switching element control for electrically charging and discharging a capacitor by means of a switching element, said machining control apparatus, comprising:
   a peak voltage detecting circuit for detecting a peak value of said machining voltage;
   a differential amplifier for receiving the peak voltage detected by said peak voltage detecting circuit;
   a V-f converter for converting the output voltage of said differential amplifier into a frequency; and
   control means for turning on and off said switching element in accordance with an output of said V-f converter so as to change a ratio of an on time period of said switching element to an off time period thereof, whereby a fluctuation in said leakage current is compensated so that said machining voltage is controlled in a manner stabilizing electric discharge machining.

5. An electric discharge machining control apparatus according to claim 4, wherein said machining control apparatus is used with an electric discharge machine which performs rough machining and finish machining each including straight machining and corner machining, said control means being operable to maintain said machining voltage at a small value enough to prevent deteriorated surface roughness of a machined surface of said workpiece when the straight machining of the finish machining is performed, said control means being operable to increase the machining voltage up to a value at which electric discharge machining is performed in a stabilized manner when the corner machining of the finish machining, where said leakage current increases, is performed.

6. An electric discharge machining control apparatus according to claim 4, wherein said capacitor electric discharge power source with switching element control includes a bipolar electric discharge power source for applying positive and negative voltages between the wire electrode and the workpiece, said electric discharge machining control apparatus comprises an absolute value detecting circuit for detecting the absolute value of the voltage between said wire electrode and said workpiece, and said peak voltage detecting circuit receives the output of said absolute value detecting circuit.

7. An electric discharge machining control apparatus for use with an electric discharge power source for applying a voltage from a DC power source, as a machining voltage, between the wire electrode and the workpiece, through a current limiting resistor circuit with a variable resistance value and a switching element, comprising:
- a peak voltage detecting circuit for detecting a peak value of said machining voltage; and
- control means having a comparator for comparing the peak voltage value detected by said peak voltage detecting circuit with a reference voltage value, said control means being operable to change, a resistance value of said current control resistor circuit in accordance with an output of said comparator, whereby a fluctuation in said leakage current is compensated so that said machining voltage is controlled in a manner stabilizing electric discharge machining.

8. An electric discharge machining control apparatus according to claim 7, wherein said machining control apparatus is used with an electric discharge machine which performs rough machining and finish machining each including straight machining and corner machining, said control means being operable to maintain said machining voltage at a small value enough to prevent deteriorated surface roughness of a machined surface of said workpiece when the straight machining of the finish machining is performed, said control means being operable to increase the machining voltage up to a value at which electric discharge machining is performed in a stabilized manner when the corner machining of the finish machining, where said leakage current increases, is performed.

9. An electric discharge machining control apparatus for use with a capacitor electric discharge power source for applying a voltage from a DC power source to a parallel circuit including a capacitor connected between the wire electrode and the workpiece and in parallel therewith, through a current limiting resistor circuit with a variable resistance value, said machining control apparatus, comprising:
- a peak voltage detecting circuit for detecting a peak value of a machining voltage; and
- control means having a comparator for comparing the peak voltage value detected by said peak voltage detecting circuit with a reference voltage value, said control means being operable to change a resistance value of said current limiting resistor circuit in accordance with an output of said comparator, whereby a fluctuation in said leakage current is compensated so that said machining voltage is controlled in a manner stabilizing electric discharge machining.

10. An electric discharge machining control apparatus according to claim 9, wherein said machining control apparatus is used with an electric discharge machine which performs rough machining and finish machining each including straight machining and corner machining, said control means being operable to maintain said machining voltage at a small value enough to prevent deteriorated surface roughness of a machined surface of said workpiece when the straight machining of the finish machining is performed, said control means being operable to increase the machining voltage up to a value at which electric discharge machining is performed in a stabilized manner when the corner machining of the finish machining, where said leakage current increases, is performed.

* * * * *